(12) United States Patent
McNeil, Sr.

(10) Patent No.: US 10,703,352 B2
(45) Date of Patent: Jul. 7, 2020

(54) BRAKE BLEEDING APPARATUS

(71) Applicant: Gilbert McNeil, Sr., Houston, TX (US)

(72) Inventor: Gilbert McNeil, Sr., Houston, TX (US)

(*) Notice: Subject to any disclaimer, the term of this patent is extended or adjusted under 35 U.S.C. 154(b) by 345 days.

(21) Appl. No.: 14/120,472

(22) Filed: May 23, 2014

(65) Prior Publication Data
US 2015/0336557 A1 Nov. 26, 2015

(51) Int. Cl.
*B60T 17/22* (2006.01)

(52) U.S. Cl.
CPC .......... *B60T 17/223* (2013.01); *Y10S 254/05* (2013.01); *Y10T 74/20666* (2015.01)

(58) Field of Classification Search
CPC .......... B60T 17/222; B60T 11/30; B60T 1/00; B60T 17/223; F16D 2125/16; Y10S 254/05; Y10T 74/20666; Y10T 70/5735
USPC ............... 188/352; 254/104, DIG. 5; 74/532
See application file for complete search history.

(56) References Cited

U.S. PATENT DOCUMENTS

| | | | | |
|---|---|---|---|---|
| 1,558,854 A * | 10/1925 | Falconer | ........... | G05G 5/06 254/113 |
| 1,681,192 A * | 8/1928 | McBride | ........... | B60T 11/04 124/37 |
| 1,760,602 A * | 5/1930 | Allen | ........... | B60S 5/00 73/132 |
| 1,877,367 A * | 9/1932 | Seppmann | ........... | B60S 5/00 177/146 |
| 1,925,219 A * | 9/1933 | Weigt | ........... | 73/131 |
| 2,171,832 A * | 9/1939 | Hoeppner | ........... | G05G 5/06 254/DIG. 5 |
| 2,513,850 A * | 7/1950 | Digman | ........... | B60W 30/18 254/133 R |
| 2,662,728 A * | 12/1953 | Hanes | ........... | B60T 17/223 251/163 |
| 2,694,318 A * | 11/1954 | Smith, Sr. | ........... | B60T 17/223 267/170 |
| 2,866,356 A * | 12/1958 | Elam | ........... | B60S 5/00 254/DIG. 5 |
| 2,932,504 A * | 4/1960 | Avery | ........... | B60T 17/223 248/354.1 |
| 2,937,842 A * | 5/1960 | Meek | ........... | E04F 21/1805 182/129 |
| 3,722,266 A * | 3/1973 | Dunham | ........... | B60T 17/223 254/DIG. 5 |
| 3,870,278 A * | 3/1975 | Lee | ........... | B66F 1/04 248/354.3 |

(Continued)

*Primary Examiner* — Monica S Carter
*Assistant Examiner* — Mahdi H Nejad
(74) *Attorney, Agent, or Firm* — Kenneth D. Baugh

(57) ABSTRACT

A brake bleeder apparatus 10 is provided which allows the brakes of an automobile 12 to be bleed by only one person. The apparatus 10 includes an elongated housing 24, having an elongated aperture 26 formed therein. A spring 28 is supported in the aperture 26 in the housing 24. A plunger 44 is aligned in the aperture 26 to engage the spring 28 so that the spring can be compressed and released to expand therein. The apparatus 10 is put in place between a steering wheel 18 and brake pedal 20 of the automobile 12 so the brake pedal is held in place by compression of the spring 28. Once the brake bleeder valve 54 is opened the brake pedal 20 is depressed thereby pushing air out of the brakes of the automobile 12. This process is repeated on each wheel until all the air is removed from the brakes.

5 Claims, 3 Drawing Sheets

(56) References Cited

U.S. PATENT DOCUMENTS

| | | | | |
|---|---|---|---|---|
| 5,238,213 A * | 8/1993 | Pool | ............... | E05C 17/047 |
| | | | | 248/352 |
| 5,299,668 A * | 4/1994 | Youngers | ............... | B60T 17/223 |
| | | | | 188/352 |
| 5,583,288 A * | 12/1996 | Brenner | ............... | B60C 23/00 |
| | | | | 248/354.5 |
| 5,765,416 A * | 6/1998 | Cote | ............... | B60R 25/005 |
| | | | | 292/339 |
| 6,029,483 A * | 2/2000 | Daniels | ............... | B60R 25/0221 |
| | | | | 70/199 |
| 6,131,712 A * | 10/2000 | Rhodenizer | ............... | B60T 17/223 |
| | | | | 188/3 H |
| 6,168,212 B1 * | 1/2001 | Finley | ............... | F16B 7/1427 |
| | | | | 285/302 |
| 6,173,590 B1 * | 1/2001 | Witchey | ............... | B60R 25/02 |
| | | | | 70/14 |
| 6,196,364 B1 * | 3/2001 | Fouts | ............... | B60T 11/30 |
| | | | | 137/614.19 |
| 6,202,519 B1 * | 3/2001 | Yandt | ............... | B25B 27/0035 |
| | | | | 81/177.2 |
| 6,439,012 B1 * | 8/2002 | Chen | ............... | B60R 25/005 |
| | | | | 70/201 |
| 6,745,653 B2 * | 6/2004 | Kurtz | ............... | B25B 27/0035 |
| | | | | 254/DIG. 5 |
| 6,792,780 B1 * | 9/2004 | De Lucia | ............... | B60R 25/005 |
| | | | | 70/202 |
| D606,431 S * | 12/2009 | Mason | ............... | D10/78 |
| 8,607,602 B1 * | 12/2013 | Okoye | ............... | G05G 5/00 |
| | | | | 70/199 |
| 8,720,861 B2 * | 5/2014 | Lee | ............... | 254/93 VA |
| 8,752,408 B2 * | 6/2014 | Neiburger | ............... | B60T 7/042 |
| | | | | 70/201 |
| 2001/0045124 A1 * | 11/2001 | Mouck | ............... | G01M 17/0074 |
| | | | | 73/132 |
| 2001/0047915 A1 * | 12/2001 | Takakubo | ............... | B60T 17/222 |
| | | | | 188/352 |
| 2004/0035264 A1 * | 2/2004 | Kurtz | ............... | B25B 27/0035 |
| | | | | 81/488 |
| 2007/0012533 A1 * | 1/2007 | Whitt | ............... | B60T 17/222 |
| | | | | 188/352 |
| 2009/0056432 A1 * | 3/2009 | Steininger | ............... | G01L 5/28 |
| | | | | 73/132 |
| 2012/0187358 A1 * | 7/2012 | Lee | ............... | B60T 17/222 |
| | | | | 254/93 VA |
| 2013/0002050 A1 * | 1/2013 | Knestel | ............... | B60T 7/042 |
| | | | | 310/12.04 |
| 2013/0284015 A1 * | 10/2013 | Menten | ............... | B60T 17/222 |
| | | | | 92/145 |
| 2013/0298543 A1 * | 11/2013 | Hsieh | ............... | F15B 21/00 |
| | | | | 60/407 |
| 2014/0250995 A1 * | 9/2014 | Vaeretti | ............... | B60T 17/223 |
| | | | | 73/132 |
| 2017/0129471 A1 * | 5/2017 | Holmes | ............... | B60T 17/223 |

* cited by examiner

BRAKE BLEEDING APPARATUS

This application claims priority of Provisional Application Ser. No. 61/965,821 filed on Feb. 10, 2014.

TECHNICAL FIELD

This invention relates to brake systems and more particularly to a brake bleeding apparatus to be used when changing the brakes of an automobile. As is well known the brakes of an automobile are to be changed from time to time because of wear and tear. Normally special procedures are required when this becomes necessary. When brakes are changed it is common for air to get into the brake line. This condition will keep the brakes from operating properly. Thus the air must be removed from the brakes. This process is known as bleeding the brakes. This is a situation of utmost concern for well accepted safety reasons. One of the more common alternatives for bleeding the brakes requires that two people are involved. One person inside the vehicle to press the brake pedal and maintain it in a predetermined position and another person outside the vehicle with a wrench opening the brake bleeder valve to allow air to be released from the brake line as the pedal is pressed.

This process although common is very time consuming and labor intensive because it requires the two people. Because the process is so labor intensive it can be expensive.

Accordingly it is desirable to have a device that can be used on the vehicle that is uncomplicated as well as inexpensive which allows the brakes to be bleed by only one person.

BACKGROUND ART

Attempts have been made to provide devices to facilitate the brake bleeding process. One such device is illustrated in U.S. Pat. No. 4,905,731. In this arrangement a brake bleeder wrench is provided with a transparent bleeder tube having a magnifying lens alone upper portions thereof. This improves visibility of air bubbles leaving the bleeder valve when the wrench opens the bleeder valve. In a modified form the head of the wrench contains an interchangeable drive hex socket to compensate for different types of bleeder valves.

Another apparatus is disclosed in U.S. Pat. No. 6,581,905 B2. This invention discloses a brake bleed tool which includes a pliable plastic tube which sealingly engages a bleed fitting. A bleed wrench coaxially slides along the tool to engage the bleed fitting. The bleed wrench includes a socket end for engaging the bleed fitting at one end and a winged end at the opposite end which is used to loosen and tighten the bleed fitting.

Although these devices may achieve the desired result these kinds of structures may be considered somewhat expensive and/or complex. Additionally they still may require that two persons are available to bleed the brakes of the vehicle. Therefore there is still an ongoing need for an apparatus that is uncomplicated structurally, and low in cost while still providing a safe method for aiding in bleeding the brakes of a vehicle while involving only one person.

DISCLOSURE OF THE INVENTION

An apparatus is provided for use when bleeding the brakes of a vehicle. This invention includes an elongated housing member having an aperture formed therein. An longitudinally extending spring is provided that is aligned in the aperture, in the housing. A plunger aligned in an upper portion of the housing is provided to engage an upper portion of the spring so that the spring can be compressed and released to expand when desired. The apparatus is designed to be aligned in a predetermined position between the brake pedal and the steering wheel of a vehicle so that the brake pedal is held in place upon compression of the spring in the housing. Accordingly when a brake bleeder valve is opened the brake pedal is depressed thereby allowing air to be pushed out of the brake line. The bleeder valve is then closed and the process is repeated until all air can be released from the brake line on each wheel of the vehicle until the brakes have been properly bleed.

BRIEF DESCRIPTION OF THE DRAWING

The details of the invention will be described in connection with the accompanying drawing in which.

BEST MODE FOR CARRYING OUT THE INVENTION

Figure 1:
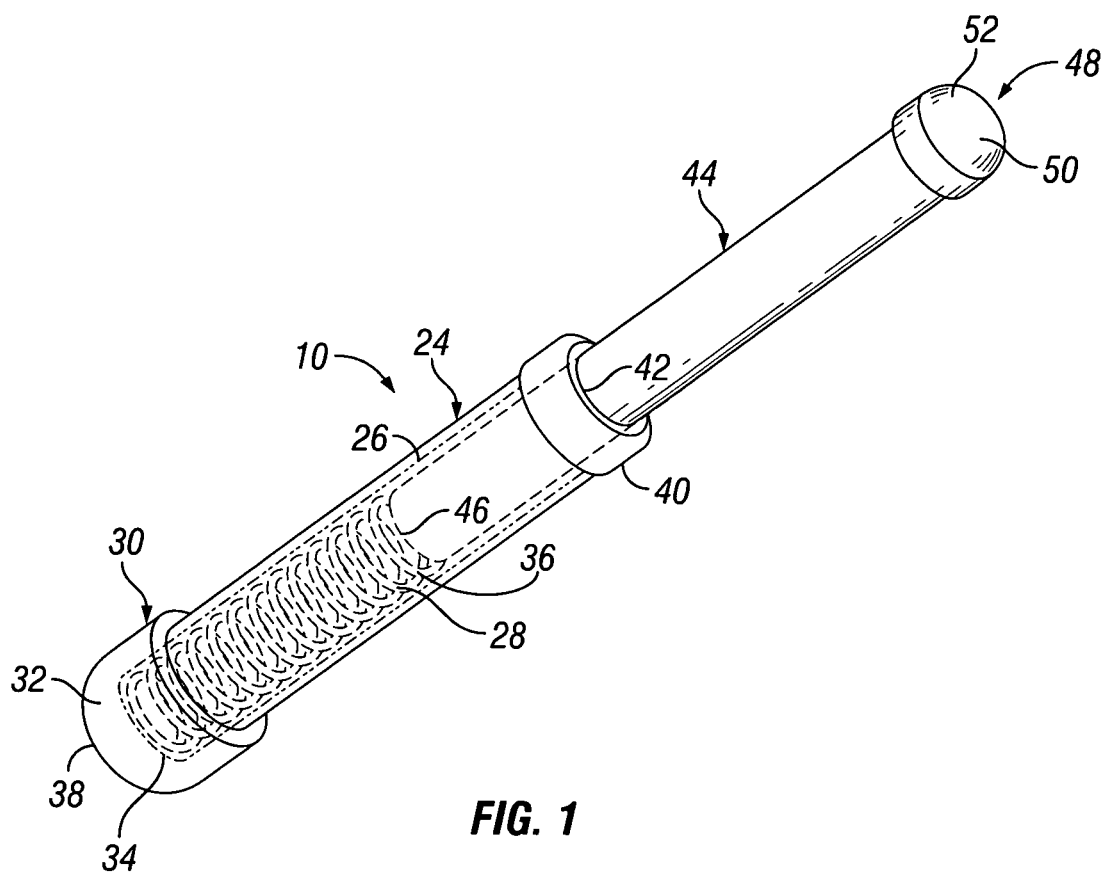
FIG. 1 is a perspective view of an apparatus used in a brake bleeding process in accordance with the principles of the invention.
Figure 2:
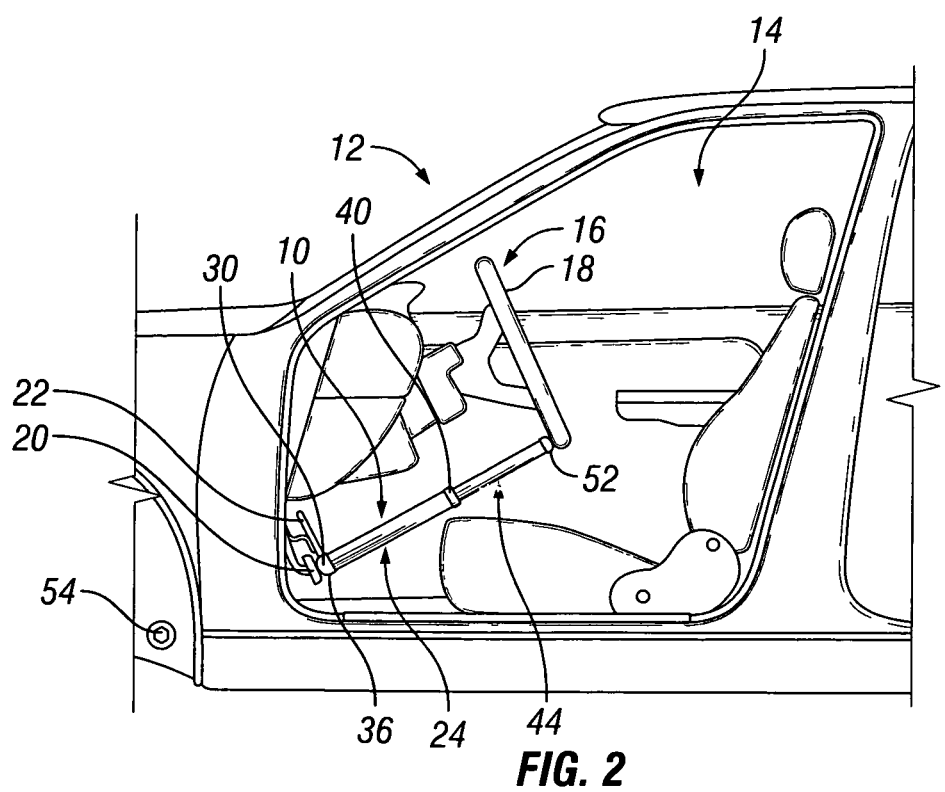
FIG. 2 is a perspective view of an apparatus used in a brake bleeding process in accordance with the principles of the invention shown in combination with portions of an automobile.
Figure 3:
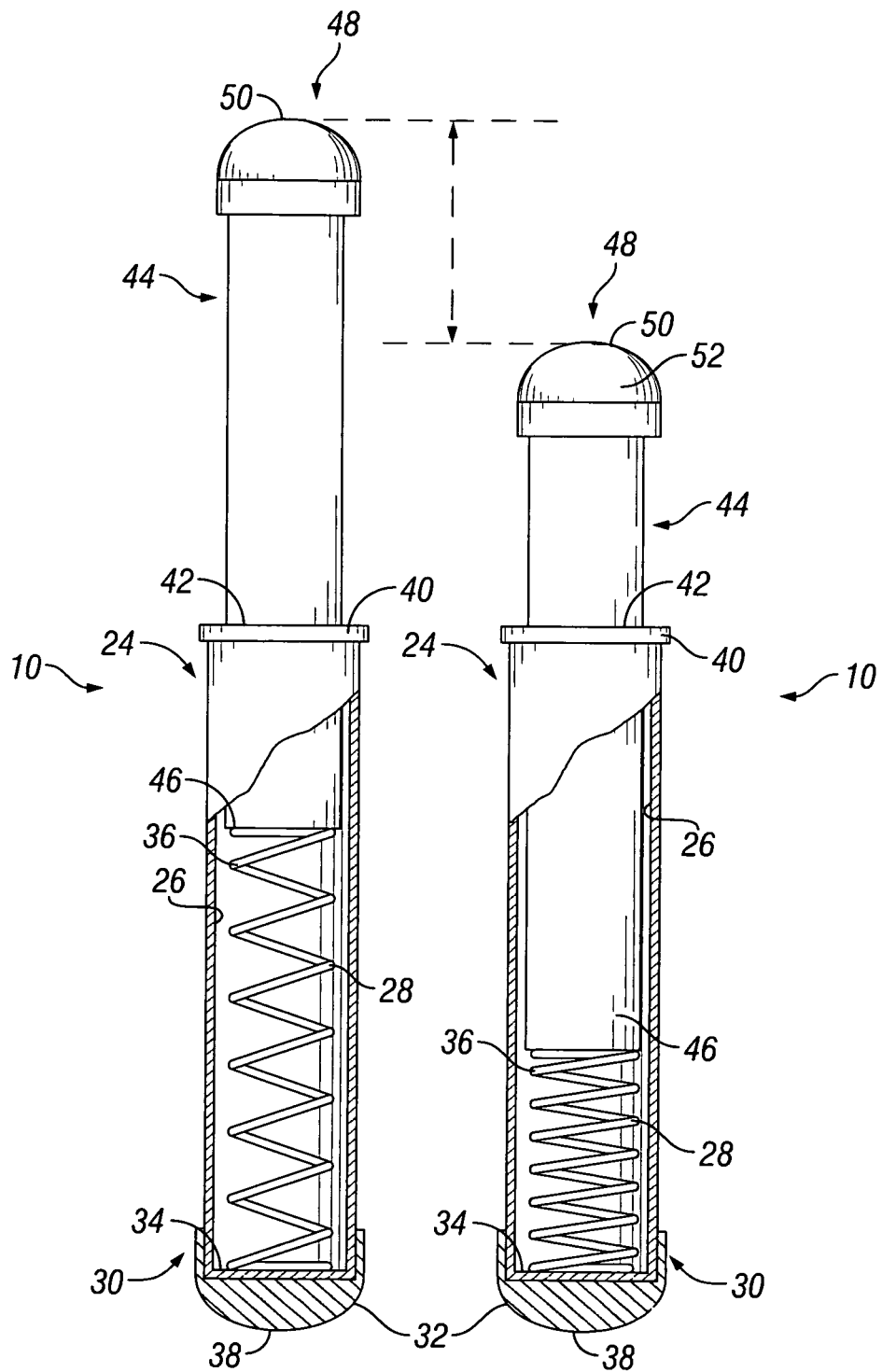
FIG. 3 is a front view of an apparatus used in a brake bleeding process in accordance with the principles of the invention with lower portions thereof cut away to illustrate internal portions thereof.

Referring to FIGS. 1, 2 and 3 there is shown, a brake bleeder apparatus, generally designated, by the numeral 10 for use with an automobile, generally designated, by the numeral, 12 to facilitate a brake bleeding process. The automobile 12 is provided with a front seat compartment, generally designated, by the numeral, 14 which includes a steering column, generally designated, by the numeral, 16 having a steering wheel 18. The front seat compartment 14 also includes a brake 20 and gas a pedal 22 which function in a well known manner.

The apparatus 10 includes an elongated housing, generally designated, by the numeral 24 having an aperture 26 formed therein. The elongated housing 24, may be, for example, twenty two and one half inches in length, and one inch in diameter. A longitudinally extending spring 28 is aligned in the housing 24. The spring 28 maybe, for example, eleven inches in length and have a diameter which is slightly smaller than the diameter of the elongated housing so that it can be aligned properly in the aperture 26.

The elongated housing 24 is also provided at a lower end thereof with a cylindrical shaped cap engaging member, generally designated, by the numeral 30. The cap engaging member 30 has a circular shaped aperture 32 formed therein which holds a lower portion 34 of the spring 28 in a predetermined position in the elongated housing 24. The cap engaging member 30 also includes a circularly shaped engaging surface 38 which is provided to engage the brake pedal 20.

The elongated housing 24 also includes an upper cap 40 having an aperture 42 formed therethrough. The cap engaging member 30 and the cap 40 may be, for example, one and one half inch in diameter so that they can properly engage and fit on the elongated housing 24.

The apparatus 10 further includes an elongated plunger, generally designated, by the numeral, 44 which is aligned in the aperture 42 of the upper elongated housing cap 40 to properly extend into the elongated housing 24. The elongated plunger 44 includes a lowermost engaging member 46 which is aligned in the housing to engage upper portions 36 of the spring 28. The elongated plunger 44 also includes an uppermost cylindrical shaped cap, generally designated, by the numeral, 48 having an aperture 50 formed therein and a circularly shaped plug or engaging member 52 which covers the aperture. The engaging member 52 of the uppermost cap cap 48 is provided to engage the steering wheel 18 to allow the apparatus to be supported between the steering wheel and the brake 20 as illustrated in FIG. 2. The diameter of the elongated plunger is slightly less than that of the elongated housing 24 so that the elongated plunger can be properly positioned in the elongated housing for slidable movement therein.

The cap 48 which fits over the uppermost portion of the plunger may be, for example, one (1) inch in diameter so that it can properly engage the plunger. Additional support may be provided to keep caps 30, 40 and 48 securely in position by for example using screws.

When it is desired to use the apparatus 10 once the appropriate brake parts have been changed the brake fluid reservoir (not shown) is filled with brake fluid. Once this is done the brake pedal 20 is pumped several times so that it is compressed. While the brake pedal 20 is compressed the engaging surface 36 of the engaging member 30 is placed on the brake pedal and the engaging member 52 of the elongated plunger 44 is placed in aligned engagement under the steering wheel 18. This will allow the spring 28 to move from its normal position to a compressed position (FIG. 3) and keep the brake pedal 20 compressed.

The wheel of the automobile (not shown) is also provided with a brake bleeder valve 54 on each of its wheels (only one shown). Once the apparatus 10 is placed between the steering wheel 18 and brake 20 the brake bleeder valve 54 can be opened. This will allow air to be released from the valve 54 causing the spring 28 to be released and expand (FIG. 3) in the aperture 26 of the elongated housing 24 thereby causing the apparatus 10 to push the brake 20 to the floor. The bleeder valve 54 is then tighten. The brake 20 is then pumped again to compress the spring 28 again thus resetting the apparatus 10 to hold the brake in place so that the bleeder valve 54 can be opened again allowing additional air to be released. This process is repeated on each wheel one at a time until all the air is out of the brake system thus allowing the brakes to work properly.

Figure 4:
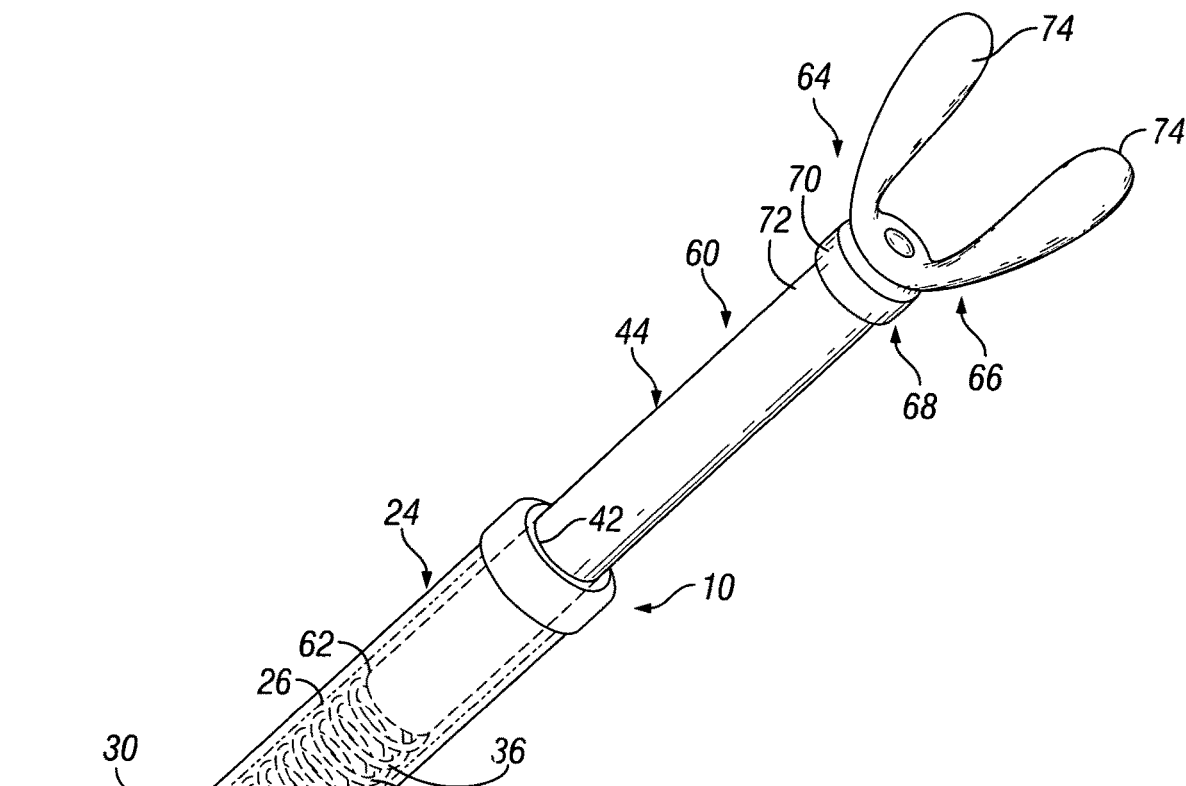
FIG. 4 is a perspective view of a second embodiment of an apparatus used in a brake bleeding process in accordance with the principles of the invention.
Figure 5:
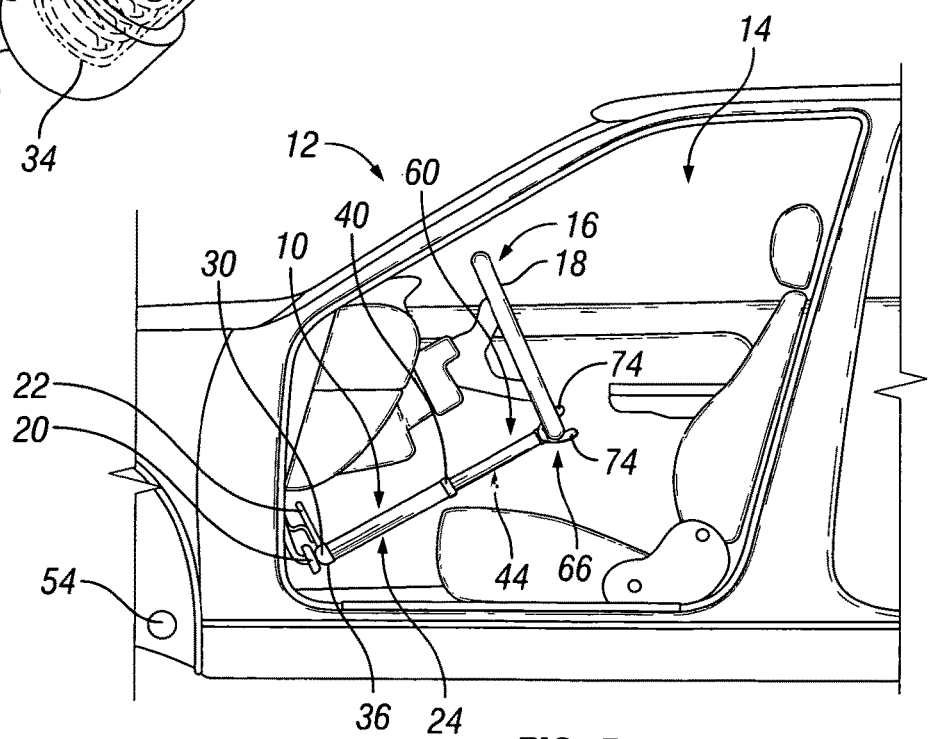
FIG. 5 is perspective view of the second embodiment of an apparatus used in a brake bleeding process in accordance with the principles of the invention shown in combination with portions of an automobile.

A second embodiment of the invention is illustrated in FIGS. 4 and 5.

In this embodiment the apparatus 10 is provided with an elongated plunger, generally designated, by the numeral, 60. The elongated plunger 60 is provided having a lowermost engaging member 62 which engages uppermost portions 36 of the spring. The plunger 60 also includes an uppermost member, generally designated, by the numeral, 64 having an engaging member 66. The engaging member 66 includes a base member 68 which includes a coupling cap 70 coupled to an uppermost portion 72 of the plunger member 60 and elongated members 74 extending upwardly from each side of the base member. In this embodiment the engaging member 66 is provided to couplingly engage the steering wheel 18 (FIG. 5) to hold the apparatus 10 in place between the steering wheel and brake 20.

The apparatus of this invention may be made of a variety of different materials depending on the particular vehicle type and the strength of material required as a result.

It should also be understood that the embodiments illustrated are for a typical automobile 12. However the dimensions of the apparatus may vary depending on the distance between the steering wheel 18 and the brake pedal 20 of the particular automobile 12.

The invention has been shown and described in what is considered to be the most practical and preferred embodiments. However, it should be recognized that changes may be made by those skilled in the art without departing from the spirit and scope of the invention.

What is claimed:

1. A brake bleeder apparatus for a vehicle including:
an elongated housing means having an elongated aperture formed therein;
a longitudinally extending spring aligned for slidable movement in the aperture of the housing;
a first cylindrical shaped cap coupled to lowermost portions of the elongated housing means for holding the longitudinally extending spring in the housing means in a predetermined position and for engaging a brake pedal of the vehicle;
an elongated plunger aligned in the elongated aperture in the housing means for slidably engaging upper portions of the longitudinally extending spring to selectively move and compress the longitudinally extending spring;
an upper cap having an aperture formed therethrough coupled to uppermost portions of the elongated housing for aligning the elongated plunger in the elongated housing for slidable movement therein; and
a second cylindrical shaped cap coupled to uppermost portions of the elongated plunger for engaging a steering wheel of the vehicle so that when the first cylindrical shaped cap is aligned to engage the brake pedal and the second cylindrical shaped cap is aligned to engage the steering wheel, the longitudinally extending spring can be selectively compressed and released to expand as desired.

2. The brake bleeding apparatus as defined in claim 1, wherein the first cylindrical shaped cap includes:
a cylindrical cap shaped member which couplingly engages the lowermost portions of the elongated housing so that the spring is held therein in a predetermined position; and
a circularly shaped surface member for engaging the brake pedal of the vehicle.

3. The brake bleeding apparatus as defined in claim 2, wherein the second cylindrical shaped cap includes a circularly shaped surface member for engaging the steering wheel of the vehicle.

4. The brake bleeding apparatus as defined in claim 3, wherein the second cylindrical shaped cap includes spaced upwardly extending members for engaging the steering wheel of the vehicle so that when the first cylindrical shaped cap is aligned to engage the brake pedal the spaced upwardly extending members can be aligned to engage the steering wheel to allow the longitudinally extending spring to be selectively compressed and released to expand as desired.

5. The brake bleeding apparatus as defined in claim 4, wherein the spaced upwardly extending members of the second cylindrical shaped cap includes:

a base member;
a first arm extending upwardly from one side of the base member; and
a second arm extending upwardly from an other side of the base member so that the steering wheel of the vehicle can be aligned between the first and second arms thereof.

\* \* \* \* \*